T. L. DAVIDSON.
Portable Fence.

No. 166,687.  Patented Aug. 17, 1875.

WITNESSES
Granville Lewis
C. M. Parks

INVENTOR
Thomas L. Davidson,
By Stansbury & Munn
Attorneys.

UNITED STATES PATENT OFFICE.

THOMAS L. DAVIDSON, OF WORTH COUNTY, MISSOURI.

IMPROVEMENT IN PORTABLE FENCES.

Specification forming part of Letters Patent No. 166,687, dated August 17, 1875; application filed June 15, 1875.

*To all whom it may concern:*

Be it known that I, THOMAS L. DAVIDSON, of Worth county and State of Missouri, have invented certain Improvements in Portable Fences; and I do hereby declare the following to be a full and correct description of the same, reference being had to the accompanying drawings, in which—

Figure 1:
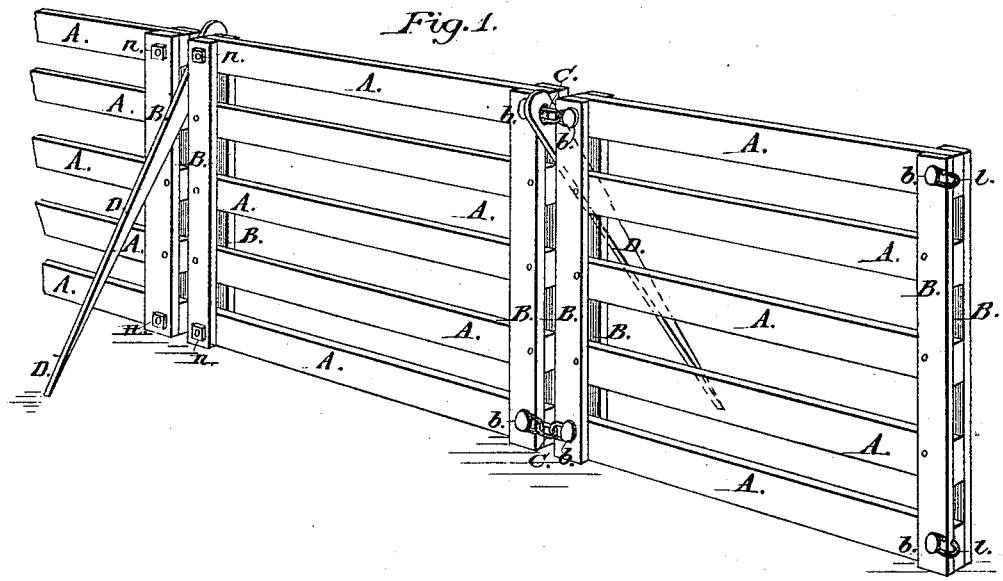
Figure 2:
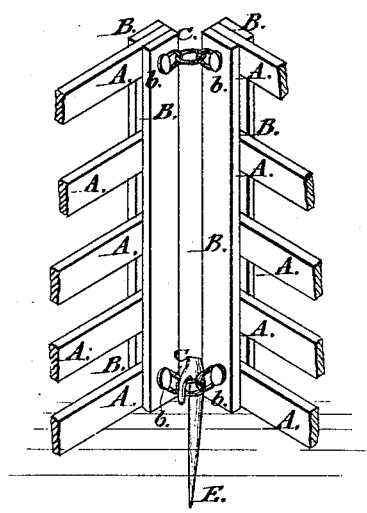

Figure 1 is a perspective view of my improved portable fence arranged in a straight line. Fig. 2 is a similar view, showing the relative positions of two adjacent panels when arranged as a worm-fence.

The same letter indicates the same part in both figures.

The nature of my invention consists in the peculiar construction of the panels, and the mode of connecting, supporting, and fixing them in position, all as hereinafter specified.

The panels are made of a suitable number of horizontal bars, A, united at their ends to upright slats B, bolted together at top and bottom by bolts $b$ and nuts $n$. The bars intermediate between the top and bottom ones may be fastened by nails to the end slats B. The bolt-heads are made large and flat, to confine the end links of a short chain, C, by which the panels are united, as shown, and which, when required, serves as a hinge. The chains C, being placed alternately on opposite sides of the panels, give the requisite flexibility to the fence when it is desired to arrange it as a worm-fence, or give it any change of direction. To the upper chains C are attached the props D, which project from the side opposite to that on which the chains are affixed, and afford lateral support to the fence when in position. The lower chains may be fixed to the ground by means of a wooden hooked stake driven into the ground, and engaging by its hook the links of the chain, as shown in Fig. 2.

Whenever it is desired to have a gateway or opening in the fence, the links $l$, attached to the panel, are made open, so that the panel can be disengaged and swung round, the chains on its opposite end serving as hinges, upon which it may turn.

This fence is cheap, easily made of any kind of lumber, strong, durable, portable, and readily changed from a straight to a worm fence, or vice versa, as desired.

I claim—

A portable fence consisting of a series of panels formed of bars A, united by uprights B, held together by the bolts $b$ and nuts $n$, said panels being united by the chains C, attached on alternate sides of the panels, as shown, and supported at top by the props D, projecting on the side opposite to that on which the chain is attached, and fixed at bottom by the ground-hooks E, all for the purposes set forth, and in the manner specified and shown.

The above specification of my said invention signed and witnessed, at Grant City, this the 8th day of June, A. D. 1875.

THOMAS L. DAVIDSON.

Witnesses:
L. J. FARWELL,
L. N. FARWELL.